United States Patent
Armiger et al.

(10) Patent No.: US 11,929,532 B2
(45) Date of Patent: Mar. 12, 2024

(54) ELECTROCHEMICAL BIOREACTOR MODULE AND METHODS OF USING THE SAME

(71) Applicant: BIOCHEMINSIGHTS, INC., Malvern, PA (US)

(72) Inventors: Travis J. Armiger, Malvern, PA (US); William B. Armiger, Malvern, PA (US); David R. Dodds, Manlius, NY (US)

(73) Assignee: BioChemInsights, Inc., Malvern, PA (US)

( * ) Notice: Subject to any disclaimer, the term of this patent is extended or adjusted under 35 U.S.C. 154(b) by 0 days.

(21) Appl. No.: 14/426,828

(22) PCT Filed: Sep. 6, 2013

(86) PCT No.: PCT/US2013/058412
§ 371 (c)(1),
(2) Date: Mar. 9, 2015

(87) PCT Pub. No.: WO2014/039767
PCT Pub. Date: Mar. 13, 2014

(65) Prior Publication Data
US 2015/0228996 A1 Aug. 13, 2015

Related U.S. Application Data

(60) Provisional application No. 61/698,702, filed on Sep. 9, 2012.

(51) Int. Cl.
*H01M 8/16* (2006.01)
*C25B 3/25* (2021.01)
(Continued)

(52) U.S. Cl.
CPC ............. *H01M 8/16* (2013.01); *C25B 3/25* (2021.01); *C25B 9/19* (2021.01); *C25B 15/02* (2013.01); *C25B 15/08* (2013.01)

(58) Field of Classification Search
CPC .......... C25B 15/02; C25B 15/08; C25B 3/04; C25B 9/08; H01M 8/16; H01M 8/08; Y02E 60/527; C12Q 1/004; C12Q 1/02
See application file for complete search history.

(56) References Cited

U.S. PATENT DOCUMENTS 6,270,649 B1 * 8/2001 Zeikus ................... C12N 13/00
205/413
6,495,023 B1 * 12/2002 Zeikus ................... C12N 13/00
205/413

(Continued)

FOREIGN PATENT DOCUMENTS

WO 2003/006713 1/2003
WO 2011/087821 7/2011

OTHER PUBLICATIONS

Park et al. (D.H. Park, M. Laivenieks, M.V. Guettler, M.K. Jain, and J.G. Zeikus, Microbial Utilization of Electrically Reduced Neutral Red as the Sole Electron Donor for Growth and Metabolite Production, Applied and Environmental Microbiology, 65(7) (1999) 2912-2917).*

(Continued)

*Primary Examiner* — Joshua L Allen
(74) *Attorney, Agent, or Firm* — Greenberg Traurig, LLP

(57) ABSTRACT

A device and process for using the device are provided for the production of commodity chemicals by biological methods which require the addition of reducing equivalents. The device allows operating conditions to be conveniently altered to achieve maximal electrochemical efficiencies for (Continued)

a given biologically mediated redox reaction, series of reactions, or fermentation process.

5 Claims, 9 Drawing Sheets

(51) Int. Cl.
*C25B 9/19* (2021.01)
*C25B 15/02* (2021.01)
*C25B 15/08* (2006.01)

(56) References Cited

U.S. PATENT DOCUMENTS

| | | | |
|---|---|---|---|
| 7,250,288 | B2 | 7/2007 | Zeikus et al. |
| 7,767,323 | B1 | 8/2010 | Cardenas-Valencia et al. |
| 2004/0101741 | A1* | 5/2004 | Minteer ............ C12N 11/08 429/401 |
| 2004/0241771 | A1* | 12/2004 | Zeikus ............ C02F 3/005 435/7.32 |
| 2005/0158618 | A1 | 7/2005 | Liberator et al. |
| 2005/0287399 | A1 | 12/2005 | Ladisch et al. |
| 2006/0251959 | A1 | 11/2006 | Karamanev |
| 2007/0259216 | A1* | 11/2007 | Logan ............ H01M 4/8605 429/2 |
| 2007/0298472 | A1 | 12/2007 | Zeikus et al. |
| 2009/0178931 | A1* | 7/2009 | Faita ............ C02F 1/4672 205/466 |
| 2010/0040909 | A1* | 2/2010 | Karamanev ............ H01M 4/90 429/2 |
| 2013/0220830 | A1* | 8/2013 | Paulus ............ G01N 30/06 205/770 |
| 2013/0302703 | A1* | 11/2013 | Bretschger ............ H01M 4/8605 429/401 |
| 2014/0083933 | A1* | 3/2014 | Choi ............ H01M 8/16 210/603 |
| 2014/0174942 | A1* | 6/2014 | Wylie ............ C25B 11/035 205/342 |

OTHER PUBLICATIONS

BioTek (P Held, BioTek Instruments, Determination of NADH Concentrations with Synergy 2 Multi-Detection Microplate Reader using Fluorescence or Absorbance (Nov. 26, 2007)).*
Ohleyer et al. (E Ohleyer, HW Blanchi, CR Wilke, Continuous Production of Lactic Acid in a Cell Recycle Reactor, Applied Biochemistry and Biotechnology, 11(4) (1985) 317-332). (Year: 1985).*
Jeantet et al. (R Jeantet, JL Maubois, P Boyaval, Semicontinuous production of lactic acid in a bioreactor coupled with nanofiltration membranes, Enzyme and Microbial Technology 16 (1996) 614-169). (Year: 1996).*
Li et al. (Y Li, A Shahbazi, CT Kadzere, Separation of cells and proteins from fermentation broth using ultrafiltration, J. Food Engineering, 75 (2006) 574-580). (Year: 2006).*
International Search Report for International Application No. PCT/US2013/058412 dated Dec. 10, 2013.
Extended European Search Report issued in European application No. 13835540.9 dated Apr. 14, 2016.
Park et al., "Microbial Utilization of Electrically Reduced Neutral Red as the Sole Electron Donor for Growth and Metabolite Production", Applied and Environmental Microbiology, vol. 65, No. 7, pp. 2912-2917, Jul. 1, 1999.
Park et al., "Microbial Utilization of Electrically Reduced Neutral Red as the SOle Electron Donor for Growth and Metabolite Production", Applied and Environmental Microbiology, vol. 65, No. 7, Jul. 31, 1999, pp. 2912-2917.
Liu et al. "Current Development in the Determination of Intracellular NADH Level", Reviews in Fluorescence 2006, pp. 107-124, XP055361556, ISBN 978-0-387-29342-4.

* cited by examiner

ELECTROCHEMICAL BIOREACTOR MODULE AND METHODS OF USING THE SAME

CROSS REFERENCE TO RELATED APPLICATIONS

This application is a national phase application of International Application No. PCT/US2013/058412 filed Sep. 6, 2013, which claims priority to and the benefit of U.S. Provisional Application No. 61/698,702 filed Sep. 9, 2012, the disclosures of each of which applications are hereby incorporated herein in their entirety.

TECHNICAL FIELD OF THE INVENTION

The invention relates generally to the use of biologically mediated reactions that alter the oxidation state of compounds, and specifically the oxidation state of carbon atoms in a given chemical compound.

BACKGROUND

In the context of chemical reactions, a reduction is the gaining of an electron by a particular chemical species and an oxidation is the loss of an electron from a particular chemical species. The general term redox reaction is short for oxidation-reduction reaction. A redox reaction is one which involves the transfer of electrons from one chemical species to another. Electrochemical cells are defined as systems that utilize a combination of redox reactions either to produce useful electrical energy, or use electrical energy to drive a combination of useful redox reactions (Silberberg, Martin (2009) *Chemistry: The Molecular Nature of Matter and Change* (5$^{th}$ Ed.) New York, NY.: McGraw-Hill).

An electrochemical cell contains two electrodes known as the anode and the cathode. The transfer of electrons from an electrode to a chemical species, that is a reduction reaction, occurs at the cathode, and the transfer of electrons from a chemical species to an electrode, that is, an oxidation reaction, occurs at the anode. In order to balance the depletion of electrons at the cathode, and the accumulation of electrons at the anode, electrons must flow from the anode to the cathode in some manner outside of the electrochemical cell, i.e. through a wire or some other material that allows the movement of electrons. This flow of electrons is an electrical current, and may be harnessed to perform work e.g. drive an electrical device. Conversely, the flow of electrons from anode to cathode may be driven by an external power source, such as a battery, causing a useful chemical reaction to occur at either the anode or the cathode, or both.

An electrochemical cell can be constructed either to generate an electrical current, that is, a unidirectional flow of electrons through a conductive element such as a wire, from spontaneous redox reactions that occur at the anode and the cathode, or it can be constructed to consume electrical current provided by an external source, such as a battery, to drive non-spontaneous reactions at the anode and cathode. In the latter case, the electrically-driven, non-spontaneous reactions may be termed electrosynthesis.

An electrochemical cell requires two reactions to occur, one at the anode and one at the cathode, the reactions occurring at each electrode are termed half-cell reactions, or half-reactions. Regardless of whether an electrochemical cell is consuming or generating an electrical current, half-cell reactions are necessarily occurring simultaneously at both the anode and the cathode.

Half-cell reactions are considered to have a positive or negative reduction/oxidation potential, termed redox potential; this is the equilibrium constant between the oxidized and reduced species of the half-cell reaction expressed in volts and relative to the dissociation of hydrogen to protons and electrons, which is considered to have a redox potential of zero volts.

Conditions under which the redox potential of the environment is more positive than the redox potential of a given half-cell reaction will force the half-cell reaction towards the oxidized species of the reaction. Conditions under which the redox potential of the environment is more negative than the redox potential of a given half-cell reaction will force the half-cell reaction towards the reduced species of the half-cell reaction.

By supplying electrons from an external source, i.e. applying a negative voltage from an external power supply in the cathode chamber of an electrochemical cell, the redox potential of the environment in the cathode chamber can be made more negative. This effect can be used to force half-cell reactions to the reduced species. To balance this, a half-cell reaction must necessarily be occurring in the anode chamber at the corresponding positive voltage, thus forcing the half-cell reaction at the anode to proceed to the oxidized species.

Thus, electrons provided to the environment in the cathode chamber of an electrochemical cell will force half-cell reactions to produce their reduced species.

Any reaction which leads to a reduction or oxidation of a particular chemical species may provide a useful half-cell reaction. This includes living systems in which the desired half-reactions are present in metabolic pathways that perform the conversion of organic compounds and are catalyzed by enzymes. As previously noted, the half-cell reactions are generally termed redox reactions, hence the enzymes which catalyze such half-reactions are generally termed redox enzymes. Typically, but not exclusively, redox enzymes require other biological components termed co-enzymes or co-factors, and it is these co-enzymes or co-factors which physically transport electrons between the various redox enzymes which catalyze the half-cell reactions (redox reactions) in a given biological system.

In order for micro-organisms to generate organic molecules useful to the micro-organism itself such as fatty acids for cellular membranes, or useful as a commercial product such as ethanol, it is necessary for a micro-organism to consume some form of carbon provided to the micro-organism. Typically this is a sugar or carbohydrate, but may be essentially any organic molecule that can be metabolized by the micro-organism. Further, the micro-organism must change the oxidation state of carbon atoms present in the carbon containing molecules provided to the microorganism, and this action is a major part of basic cellular metabolism. In order to oxidize a given carbon atom, the metabolic processes of the micro-organism must remove electrons from the carbon atom of interest, and in order to reduce a given carbon atom, the metabolic processes must provide electrons to the carbon atoms of interest.

In the case of oxidation, this is easily achieved by using molecular oxygen from the environment (e.g. from air) as a "sink" for electrons, and in the process, the oxygen molecule is electrochemically reduced, typically producing two water molecules.

In the case of reduction, the metabolic processes in the micro-organism must oxidize some other chemical species to provide electrons for performing the desired reduction. Most commonly in the case of micro-organisms growing on a carbon source such as a carbohydrate, reducing equivalents are generated by completely oxidizing a portion of the carbohydrate to $CO_2$, that is, some of the carbohydrate provided to the micro-organism is sacrificially oxidized in order to provide electrons for the micro-organism to use in metabolic processes that produce organic molecules that are more reduced. While the resulting electrons are desirable and useful to the microorganism, the carbon atoms sacrificed by oxidation to $CO_2$ are lost.

This loss of carbon atoms that were present in the original input sugar or carbohydrate reduces the amount of product that a micro-organism can make from a given mass of input carbonaceous material, e.g. sugar or carbohydrate. For example, in order for a micro-organism to produce ethanol from the sugar glucose, it is necessary for the micro-organism to generate electrons for the metabolic steps which transform glucose to ethanol. This is accomplished by sacrificially oxidizing some of the glucose to $CO_2$ in order that the remaining glucose can be transformed to ethanol. In this process, for every 180 grs of glucose provided to a micro-organism for conversion to ethanol, 88 grs are lost as $CO_2$ and only 92 grs of ethanol are produced. Thus for every metric tonne of glucose provided to a commercial fermentation process, a maximum of only 511 kgs of ethanol can be produced, while 489 kgs of $CO_2$ are produced.

Considering only the carbon atoms present in a molecule of glucose, that is, six carbon atoms, only 4 carbon atoms are present in the desired ethanol product while two of the carbon atoms are lost as $CO_2$. Thus, the "carbon efficiency" of the fermentation of glucose to ethanol is only two-thirds.

It is theoretically possible to convert glucose to ethanol without creating $CO_2$ (see U.S. Patent Application Publication No. 20120052542 (Mar. 1, 2012)) but this requires supplying the necessary reducing equivalents electrochemically.

Similar calculations will apply to all metabolic processes which sacrifice some of the input carbonaceous material in order to provide electrons for desired metabolic processes.

If electrons could be provided from an external source, that is, an electrical current, then the need to sacrifice input carbonaceous material to provide electrons would be reduced or eliminated, and the carbon efficiency of processes such as the example just given for ethanol production, could reach 100%. For the example of ethanol production from glucose, if sufficient electrons could be provided to drive the carbon efficiency to 100%, then 700 kgs of ethanol could be produced from one metric tonne of glucose, instead of only 511 kgs. Further, no $CO_2$ would be produced.

Significantly improved carbon efficiencies could be achieved in fermentation processes for production of succinic acid, n-butanol, iso-butanol, methane, adipic acid and any other product that requires reducing equivalents to be generated from the carbohydrate starting material provided to the fermentation.

It is thus highly desirable to provide electrons from an external source to a biological system that would otherwise sacrifice some of the input carbonaceous material for the production of useful compounds. In such a desirable process, all of the carbon atoms provided to the metabolic process from the input material may be transformed to the desired product. This positively alters the stoichiometry of the chemical reaction from the normal situation, that is, the situation in which no external electrons are supplied and some of the input carbonaceous material must be sacrificially oxidized, to one in which the carbon efficiency is 100%. The result is the "decoupling" of hydrogen stoichiometry from carbon stoichiometry in a given chemical reaction.

Some biological systems can utilize hydrogen gas directly as a reducing agent, that is, as a source of electrons. However, the physical storage, transport and handling of hydrogen is unattractive. On-site generation of hydrogen gas may avoid some of those unattractive issues, but the necessary mixing of hydrogen gas in a fermentation system will be limited by the very low solubility of hydrogen in water, and the surface area of the gas/liquid interface between a bubble of hydrogen gas and the surrounding aqueous fluid. To achieve useful rates of hydrogen transfer, fermentor design and energy input for agitation must be considered and these are also unattractive. It is therefore desirable to introduce reducing equivalents as electrochemical species inherently compatible with heterogeneous aqueous biological systems.

Nature already has at least one method of providing electrons from an external source for use in producing compounds useful to a living cell, and this is achieved via photosynthesis. Obviously, such a provision of electrons is available only to organisms possessing photosynthetic metabolism and exposed to a light source. By supplying electrons to a biological system from an externally driven electrical current, the yield advantage of chemical reactions driven by photosynthesis can be brought to essentially any chemical reaction requiring reducing equivalents. However, the biological efficiency of photosynthesis is limited to less than 10% and across the entire biosphere, photosynthesis is generally considered to have only between 4% and 5% efficiency (see Zhu et al., Annu. Rev. Plant Biol. 61:235-61, 2010). Thus, by driving chemical reactions with electrochemically supplied reducing equivalents, not only is the stoichiometry of such reactions fundamentally changed, but the new electrochemical processes can be run with greater overall energy efficiency than natural photosynthetic processes.

This desire has been recognized by others, and a number of attempts to deliver electrons to biological systems have been published.

Zeikus et al., *Journal of Bacteriology*, 181 (8), pp. 2403-2410, (April 1999) provides evidence that separation of the carbon source from reducing equivalents can favorably change the carbon flux through a microbe, increasing carbon efficiency and thus product yield, and decreasing undesired $CO_2$ formation which wastes carbon.

It is documented that butanol can be produced by fermentation, but low yields remain a hurdle (see Machado, C., "Technical Characteristics and Current Status of Butanol Production and Use as Biofuel," presented at the BIO V Seminario Latinoamericano y del Caribe de Biocombustibles 2010, Santiago, Chile (Aug. 17-18, 2010)). James Liao and co-workers at UCLA are attempting to overcome this problem by feeding electrochemically generated formate to *Rolstonia* to produce biofuels. However the current yield, productivity and titer need to be increased significantly for a commercially viable process (see AIChE, "Update: Plug-In Bacteria Produce Fuel from $CO_2$," *Chemical Engineering Progress*, pp. 12-13, May 2012).

Using formate as both the carbon source as well as the reducing equivalents is the least effective method in terms of both carbon efficiency and energy utilization. Based upon the pathways that have been engineered into the organism, both isobutanol and 3-methyl-1-butanol (3 MB) require two or three additional formate molecules ($HCOO^-$) respectively, in addition to the four and five formate carbons respectively, forming the product backbone. These additional formate carbon atoms are released by the cell as $CO_2$ from the engineered metabolic pathway. Thus, the organism will require a minimum of 6 or 7 formate carbons per isobutanol or 3 MB molecule. Supplying more than this number unnecessarily lowers the carbon efficiency and decreases the energy efficiency because it is more costly and less efficient to electrochemically reduce carbon dioxide to formate then to reduce water to hydrogen and oxygen. However, the system must supply this excess carbon for the cell to obtain the proper amount of electrons.

One of the central problems in the above efforts is that the direct electron transfer between microbial cells and electrodes occurs at very low efficiencies (See, Allen, "Cellular Electrophysiology", p. 247-283, In J. R. Norris and D. W. Ribbons (eds.). *Methods in Microbiology*. Academic Press, New York, 1992) and electron transfer from a biological system carrier to an electrode generally requires an electron transport mediator (See, Fultz et al., *Anal. Chim. Acta*. 140:1-18, 1982).

Published examples show that a number of methods have been used to mediate the transfer of electrons from a biological system to an electrode for the generation of an external electrical current, that is, in the construction and operation of a biological fuel cell. A biological fuel cell is a device that directly converts microbial metabolic power into electricity using electrochemical technology. (See, for example, Allen, "Cellular Electrophysiology", p. 247-283, In J. R. Norris and D. W. Ribbons (eds.). *Methods in Microbiology*. Academic Press, New York, 1992; Bennetto, et al., *Biotechnol. Lett.* 7:699-105, 1985; Roller et al., *J. Chem. Tech. Biotechnol.* 346:3-12, 1984; and Thurston, et al., *J. Gen. Microbial.* 131:1393-1401, 1985).

Chemical energy may be converted to electric energy by coupling the biodegradative oxidation of organic or inorganic substrates to the chemical reduction of an oxidant at the interface between the anode and the cathode (see, Willner et al., *Bioelectrochem. Bioenerg*, 44:209-214, 1998). In biological fuel cells, two electron transfers are required, one for coupling reduction of an electron transfer mediator to biological oxidative metabolism, and the other for coupling oxidation of the electron mediator to the reduction of the electron acceptor on the cathode surface where the electron acceptor is regenerated with atmospheric oxygen (see, Ardeleanu, et al., *Bioelectrochem. Bioenerg*, 11:273-277, 1983; and Delaney, et al., *Chem. Tech. Biotechnol.* 34b:13-27, 1985).

Metabolic reducing power produced by *Escherichia coli* or *Proteus vulgaris* has been transferred to the anode and converted to an external electrical current by using mediators such as 2-hydroxy-1,4-naphtoquinone (HNQ) or thionin (see, Tanaka et al., *Chem. Tech. Biotechnol.* 42:235-240, 1988; and Tanaka et al., Chem. Tech. Biotechnol. 35B: 191-197, 1985).

Park et al. in *Biotech. Techniq.* 11:145-148, 1997 confirmed that viologen dyes (see, Kim et al., *Biochem. Biophys. Res. Com.*, 180:11276-1130, 1982; and Morimyo, J. Bacteriol. 170:2136-2142, 1988) cross-linked with carbon polymers and absorbed to *Desulfovivrio desulfuricans* cell membranes can mediate electron transfer to electrodes.

Kim et al. in *J. Microbial. Biotechnol.*, 9:127-13, 1999 showed that *Shawella putrefacians*, which contains outer-membrane cytochromes able to reduce Fe(III), was electroactive and, that it could grow on lactate as the electron donor with a graphite felt electrode as the electron acceptor in a complex biofuel cell.

The above examples illustrate the transfer electrons from a biological system to an electrode. The opposite situation, that is, the transfer of electrons from an electrode (the cathode) to a biological system, is also improved by the use of electron transport mediators, and the compound neutral red (NR) enjoys general use in this regard.

U.S. Pat. No. 6,270,649 to Zeikus et al. shows that neutral red is an improved electron mediator for either converting electricity into microbial reducing power for enhanced cell growth and production of reduced end-products (see, Park et al., *Appl. Environ. Microbiol.* 65:2912-2917, 1999; and Park et al., *J. Bacteriol.* 1812:2403-2410, 1999), or converting microbial reducing power into electricity in biofuel cells (see, Park and Zeikus, *Appl. Environ. Microbiol.* 66:1292-1297, 2000).

Park et al. in *J. Bacteriol.* 1812:2403-2410, 1999, provides the first biochemical evidence of how NR functions physiologically by showing that (i) the electrical reduction of NR is chemically linked to NAD+ reduction and that it is biochemically linked to generation of a proton motive force and succinate production and (ii) that NR appears to function by replacing menaquinone in the membrane-bound complex.

Park et al. in *Biotech. Lett.* 22: 1301-1304, 2000, showed that binding neutral red to a graphite electrode further enhanced electron transfer efficiency in microbial fuel cells.

The electrical enhancement of fermentations and biotransformations also involves the utilization of an electrode and electron mediator in a bioreactor system to enhance the production of reduced end products (see, Hongo et al., *Agri. Biolio. Chem.*, 43: 2075-20811 1979; Hongo et al., *Agri. Biolio. Chem.*, 43: 2083-2086, 1979; Kim et al., 1988; Park and Zeikus, *J. Bacteriol.* 181: 403-2410, 1999; and Shin et al., *Appl Microbiol Biotechnol.*, DOI 10.1007/5002530100809. Online publication: Sep. 22, 2001.) For example, a graphite felt electrode and soluble neutral red can greatly enhance the yields of succinate produced by fermentation (see Park and Zeikus, *J. Bacteriol.* 181: 403-2410, 1999) and, tetralol produced by yeast transformation (Shin et al., *Appl Microbiol Biotechnol.*, DOI 10.1007/5002530100809. Online publication: Sep. 22, 2001).

In addition to using whole cells, that is, intact microorganisms, to produce useful molecules from carbonaceous input material, it is possible to use isolated redox enzymes, coupled with any necessary cofactors, to catalyze redox reactions, and the use of oxidoreductases in electrochemical cells has also been proposed, such oxidoreductase requiring the use of redox cofactors such as $NAD^+$.

One major factor limiting the utilization of oxidoreductases in chemical syntheses (see, e.g., S. M. Roberts et al., *Chimicaoggi*, July/August 1993, pp. 93-104; and D. Miyawaki et al., *Enzg. Microbiol. Technol.* 15:525-29, 1993) or in chemical detection, i.e., biosensors (see, e.g., P. N. Bartlett, *Med. And Biol. Eng. and Comput.* 28: BIO-B7, 1990; and D. Miyawaki et al., supra) is the lack of a facile system for regeneration or recycling of the electron transferring cofactors (e.g., nicotinamide adenine dinucleotide, quinones, flavin adenine dinucleotide, etc).

While electrons may be transported by co-factors in biological systems as single electrons, transport of electrons frequently occurs as pairs of electrons. In the case of pairs of electrons, a proton is also formally transported, and the formal chemical species is thus a hydride, that is, a hydrogen atom bearing an additional electron and hence a negative charge, and generally written as "$H^-$".

Within biological systems, such species are historically termed "reducing equivalents", as the formal addition of hydride to a chemical species results in a reduction of that chemical species. Formally, an additional, second proton is required to neutralize the formal negative charge that the reduced product of the reaction would carry through addition of the hydride species. Most commonly in biological systems, the necessary protons are provided simply via hydronium ions (i.e. a protonated water molecule, $H_3O^+$). Within an electrochemical cell, protonated water molecules may be generated at the anode and allowed to migrate to the cathode.

It has been reported by Park and Zeikus in *J. Bacteriol.* 181:2403-2410, 1999 that neutral red would undergo reversible chemical oxidoreductions with nicotinamide adenine dinucleotide that is, neutral red in its reduced form ($NR_{red}$) has a sufficiently low redox value that it will transfer electrons to, and thus reduce, the redox cofactor NAD+ from its oxidized form to its reduced form NADH. In this process, neutral red becomes oxidized to the species $NR_{ox}$ which is then available to accept an electron from the cathode and thus return to the reduced form $NR_{red}$, which is in turn available to reduce NAD+.

It has also been reported that by using soluble neutral red in electrochemical reactors containing microbes that: microbes could grow on electricity alone; diverse microbes could over-produce a variety of reduced biochemicals during fermentations of biotransformations; and that microbes could generate electricity during metabolism of organic matter. (See, e.g., Park et al., *Appl. Environ. Microbiol.* pp. 2912-2917, 1990; Park and Zeikus, *Appl. Environ. Microbiol.*, 66:1292-1297, 2000; and U.S. Pat. No. 6,270,649).

U.S. Pat. No. 7,250,288 B2 to Zeikus et al. discusses the need for improving electrode efficiencies in electrochemical bioreactor system and proposes improvements such as linking nicotinamide adenine dinucleotide ($NAD^+$), neutral red, and fumarate reductase to the electrode in order to improve electron transfer characteristics. While the above may improve electron transfer characteristics, it may also be advantageous to improve upon electrode design and electrochemical bioreactor system design in other ways.

The literature on commercial-scale electrochemical process equipment used in the production of chlorine, ozone and hydrogen peroxide documents that the scale of electrodes used in laboratory electrochemistry research often has poorly defined fluid flow and mass transport characteristics, and provides scale-up challenges (Walsh, F., and G. Reade, *Analyst*, 119 (1), pp. 797-803 (May 1994)).

Succinic Acid fermentation is a well-known process (see U.S. Pat. Nos. 5,143,833; 5,573,931; 5,504,004; and 5,723, 322; U.S. Patent Application Publication Nos. US 2008/ 0305533 and 2005/0032195; and Song, H., and S. Y. Lee, *Enzyme and Microbial Technology*, 39 (1), pp. 352-361 (2006)) which the proposed system could be used to improve on an industrial scale.

Providing reducing equivalents to a microorganism can be accomplished by regenerating NADH. The standard potential is often reported in the literature as −0.32V, however according to Karyakin et al. a potential of −0.59V at pH 6 may be more accurate (see Karyakin et al., *Electrochemistry Communications* 5: 677-680, 2003).

Various detectors for monitoring intracellular NADH have been described in U.S. Pat. No. 4,577,110; Armiger et al., *Chemical Engineering Communications*, 45 (1), pp. 197-206 (1986); Humphrey et al., Chapter 20 in Squires, R. G.; G. V. Reklaitis, eds.," Volume 124, American Chemical Society, Washington, DC., pp. 355-366 (1980); Ristroph et al., *Journal of Fermentation Technology*, 55 (6), pp. 599 (1977); U.S. Pat. Nos. 5,466,604; 5,401,412.

Reduced electron shuttles can transfer electrons to several distinct electron-withdrawing compounds, such as azo dyes, polyhalogenated compounds, nitroaromatics and oxidized metalloids. Van der Zee and Cervantes review the results of reductive biotransformation process catalyzed by electron shuttles (see Frank P. Van der Zee and Francisco J. Cervantes. *Biotechnology Advances* 27: 265-277, 2009).

In order for electrochemical bioreactors to become commercially viable a change in the hardware design and processes design of the conventional systems must take place in order to improve yield and efficiencies to practical levels.

Further, while Zeikus, Liao and others have previously recognized the desirability of providing external electrons to biological systems, the methods revealed for accomplishing this in the examples provided therein require the anode to be contained in a manner that will prevent it from undergoing undesired reactions with the bulk biological system. Thus, some physical arrangement must be made to provide electron transfer to the anode, while keeping the anode physically separate from the fermentation broth (in the case of whole cells) or a buffer system (in the case of isolated enzymes in aqueous medium), and this is done with a variety of membranes, salt bridges or other physical means. Simplifying the design of the electrochemical cell relative to previously revealed designs, and further, designing a cell for use in a continuous, flow-through system (such as a loop running through a large fermentation vessel or chemical reactor) is desirable. It is even more desirable to arrange the electrochemical cell in a manner that utilizes a simple half-reaction at the anode, and that operates in a manner to avoid the use of salt-bridges for connectivity of the anode and cathode chambers, and mitigates membrane fouling when a membrane is used to separate the anode and cathode chambers.

SUMMARY OF THE INVENTION

Figure 1:
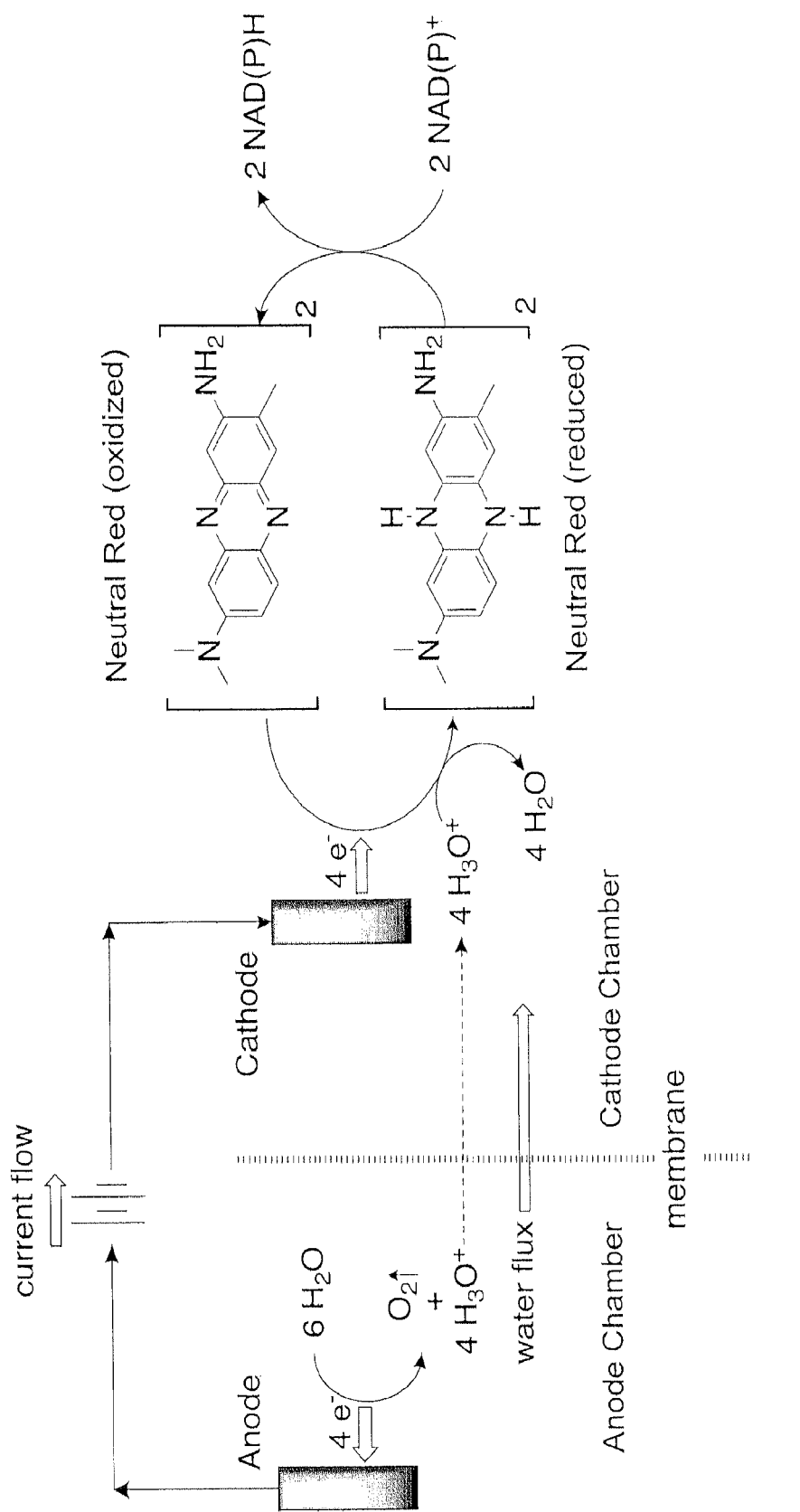
FIG. 1 illustrates, in one embodiment, the overall electrochemistry and general arrangement of the electrochemical cell.

The present invention relates, in one aspect, to a device used to regulate carbon flux occurring in various metabolic processes of microorganisms with the aim to maximize carbon efficiency and product formation. For example, embodiments of the present invention use biologically mediated reactions that alter the oxidation state of compounds, and specifically the oxidation state of carbon atoms in a given chemical compound. These reactions require the transfer of electrons either to or from the compound being acted upon by the biological mediator, such as an enzyme, group of enzymes, or whole microbial cell. In some embodiments, the transfer of electrons can be performed using a physical device, e.g., an electrochemical cell, and more specifically, an electrochemical cell with integral instrumentation and various physical attributes which are advantageous to use for transferring electrons to or from biological systems which mediate reduction and oxidation reactions, and more specifically, the reduction and oxidation of carbon atoms to form useful compounds.

The device of the present invention can be used as a means to transfer protons and electrons to a biological system, such as a whole cell, single enzyme, or group of enzymes with the reducing equivalents required to perform the desired redox reaction or reactions.

In the case of providing reducing equivalents to a redox enzyme, for example, cytochrome P450 and alcohol dehydrogenase of enzyme class EC 1.1.1.n or EC 1.1.1.-.

In the case of providing reducing equivalents to a whole cell performing fermentation on a provided carbon source, supplying external reducing equivalents will eliminate or reduce the amount of the provided carbon source consumed to generate the reducing equivalents required to drive the desired reaction. This process can allow microorganisms to utilize all of the given carbon source to produce product with up to 100% carbon efficiency.

In one aspect, a device is provided, comprising: an anode contained in an anode chamber and a cathode contained in a cathode chamber, the two chambers being separated by at least one membrane with allows water molecules, either neutral or positively charged, to pass through the membrane from one chamber to the other, wherein the anode chamber contains deionized water therein in contact with the anode; an aqueous medium containing a biological system in the cathode chamber in contact with the cathode, said biological system being capable of performing a reductive biological process; an external power source providing a voltage between the anode and the cathode; and a detection instrumentation having control means for controlling the reductive biological process.

In some embodiments, the aqueous medium further comprises an electron transport mediator. The device can further comprise a member for recirculating the aqueous medium from an external vessel through the cathode chamber and back in to the external container. The external vessel can be a fermentation tank.

In certain embodiments, the device can have one or more separation membrane situated between the cathode and the biological system, such that the cathode is not in direct contact with the biological system. The separation membrane can create an additional compartment or compartments and can retain an electron transport mediator that is optionally in a fluid medium, such that the electron transport mediator can provide electron transport from the cathode through the intervening compartment to the biological system.

In various embodiments, the electron transport mediator can be humic acid and/or neutral red.

In another aspect, a method of performing reductive processes in a biological system is provided. The method includes: providing the device described herein in which at least a portion of the biological system performing the reductive process is present in the cathode chamber; placing a suitable amount of an electron transport mediator in the cathode compartment, wherein at least a portion of the electron transport mediator is reduced, and the biological system is capable of performing a chemical reduction; and applying a suitable voltage from the external power source between the anode and the cathode.

In a further aspect, a method for the production of commodity chemicals is provided. The method includes using the device described herein for providing reducing equivalents to a fermentation process by: flowing a fermentation broth through the cathode chamber; applying voltage from the external power source between the anode and the cathode; and optionally utilizing an electron transport mediator by: (1) adding the mediator directly to the fermentation broth; or (2) providing the mediator on the separation membrane.

In various embodiments, the fermentation broth can include a fermentation product for the production of succinic acid, 1,4-butanediol, ethanol, n-butanol, and/or iso-butanol. The fermentation broth can also comprise a micro-organism that has been altered to increase its ability to utilize electrons provided by the device described herein. In some embodiments, the micro-organism has been genetically altered to express molecules in its cell membrane or surface which facilitate electron transport.

In still a further aspect, a method of performing reductive processes in a biological system is provided. The method includes using the device described herein for providing reducing equivalents to a reaction catalyzed by a redox enzyme, wherein the reaction is in need of the reducing equivalents from a biological mediator, and wherein the redox enzyme receives the reducing equivalents from the cathode, optionally via an electron transport mediator. The biological mediator is NADH, NADPH and/or FMNH2. The enzyme can comprise a P450 enzyme and a P450 reductase. The enzyme can also comprise a modified P450 enzyme that has been engineered to include a P450 reductase activity.

In still further embodiments, other commercial applications of the devices and/or methods of the present invention include the denitrification process in either drinking water or wastewater treatment in which a carbon source such as glycerol or methanol is added to the bioreactor to generate reducing equivalents for denitrifying bacteria.

DETAILED DESCRIPTION OF THE INVENTION

The present invention includes a system which can enable novel process technology that decouples hydrogen stoichiometry from carbon stoichiometry. Technology which decouples hydrogen stoichiometry from carbon stoichiometry is demonstrated by Flynn (see Flynn et al., *mBio*, 1 (5), pp. 1-8, 2010). The present invention involves a new process used to regulate carbon flux through metabolic pathways. Properly controlling the electrical current and voltage is essential to delivering reducing equivalents so that cellular metabolism, which is a series of tightly linked oxidation and reduction reactions, can be balanced to maximize product yield and process efficiency. The systems and devices described herein advantageously allow such control.

Another advantage of the present invention is an on-line, continuous fluorometric detector for monitoring intracellular NADH or NADPH, ("NAD(P)H") which will allow for a novel monitoring of cellular metabolism in real time.

The present invention also advantageously simplifies the design of the electrochemical cell relative to previously revealed designs, and further, provides a cell for use in a continuous, flow-through system (such as a loop running through a large fermentation vessel or chemical reactor). The present invention additionally arranges the electrochemical cell in a manner that utilizes a simple half-reaction at the anode, and that operates in a manner to avoid the use of salt-bridges for connectivity of the anode and cathode chambers, and mitigates membrane fouling when a membrane is used to separate the anode and cathode chambers. In addition, the present invention is capable of direct physical incorporation into a continuously flowing loop running off of a fermentor or reactor, and can thus be used with existing infrastructure.

The present invention, in some embodiments, is termed an "Electrochemical Bioreactor Module" or EBM. The EBM comprises an electrochemical cell with an anode contained in an anode chamber, a cathode contained in a cathode chamber, and a membrane separating the two chambers.

As shown in FIG. 1 which illustrates, in one embodiment, the overall electrochemistry and general arrangement of the electrochemical cell, net water flux from the anode chamber (the "deionized water side") to the cathode chamber (the "fermentor side") is indicated, together with externally driven current flow and the electrochemical species. Neutral Red is shown as an exemplary electron transport mediator between the cathode and the oxidized redox cofactors NAD+ or NADP+ ("NAD(P)+"). For clarity, the stoichiometry shows a 4-electron transfer (2×2-electrons) to avoid fractional mols of $O_2$. For each pair of electrons provided by the electrochemical cell, one NAD(P)+ is reduced to one NAD(P)H and one water molecule is consumed. In this process, 0.5 molecules of $O_2$ generated for every NAD(P)H formed.

Figure 2:
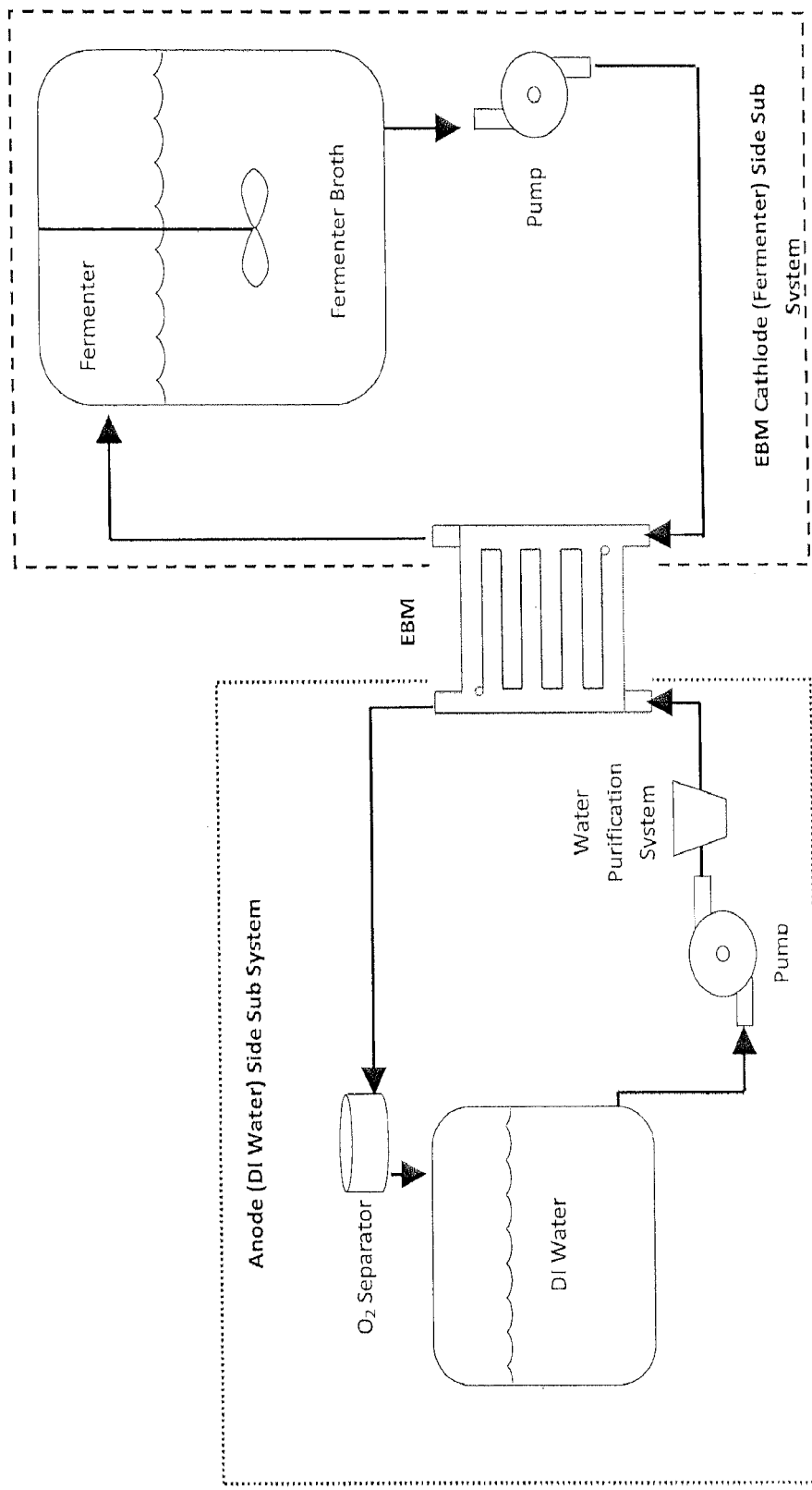
FIG. 2 illustrates an exemplary device having two "sides" of the EBM System, the fermentor side, and the deionized water (DI) side.

The EBM System can have two "sides", the fermentor side and the deionized water (DI) side, as shown in FIG. 2. The fermentor side as illustrated contains the fermentation broth, fermentor tank, fluorometric NADH sensors, optional ultrafiltration system for cell recycle and cell-free broth (which filters the fermentation broth to collect and recycle the cells and other solids back into the fermentor tank, while allowing the cell-free broth to continue to the cathode side, thereby avoiding blocking the fluid passage way in the cathode side with cells or other solids), fermentor pump, and cathode and cathode chamber of the electrolyzer, hydrogen gas collection and measurement system, pressure measurement system. The DI side contains the DI water reservoir, DI water pump, water purification system (modules for duel resin deionization, filtration, ultraviolet sterilization and vacuum membrane degassing), oxygen collection and measurement systems, and anode and anode chamber of the electrolyzer.

Figure 3:
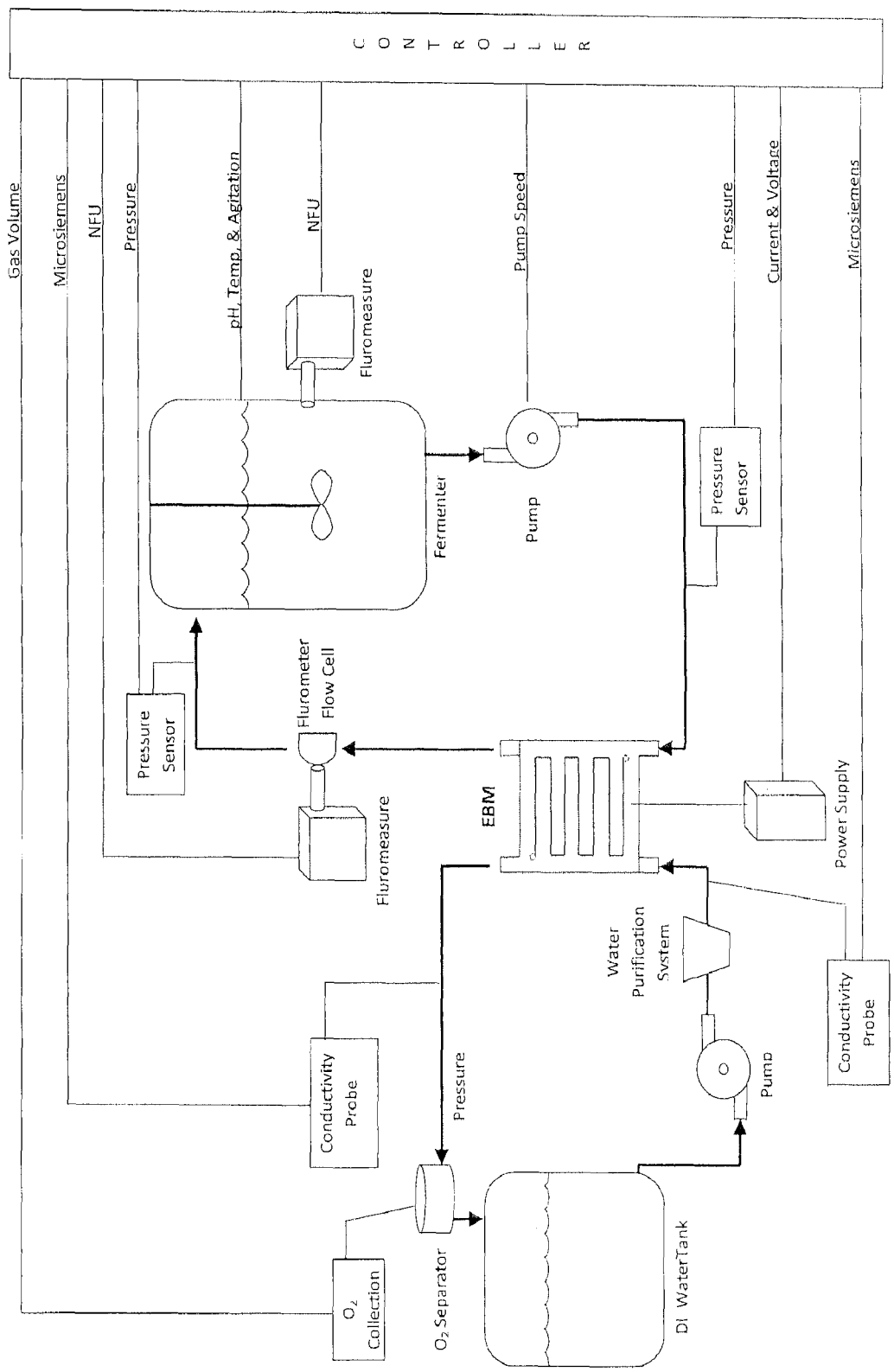
FIG. 3 illustrates an exemplary EBM system design diagram.

FIG. 3 illustrates an exemplary EBM system design diagram. It shows the main components of the EBM system, as well as the parameters that are measured and controlled throughout the system.

In certain embodiments, the membrane used to separate the anode and cathode chamber is a modified Nafion® (DuPont) membrane which allows only protons (as hydronium ions, $H_3O^+$) to travel across it. The membrane can contain an oxygen catalyst on the anode side, for the production of oxygen gas.

The EBM can further include an electrochemical cell with an integrated instrumentation, that instrumentation comprising one or more of anode side oxygen collection system, cathode side gas collection system, flow rate control system, temperature measurement and control system, voltage and current measurement and regulation systems, pH measurement system, dissolved oxygen (DO) measurement system, conductivity measurement system, metabolic activity (fluorescence) measurement systems. Such an integrated system allows the following actions which are of great utility: electron and proton transfer regulation and optimization, microbial side by-product minimization, $H_2$ gas elimination or minimization, desired product optimization, deionized (DI) water purity analysis, complete mass balance analysis, flow rate control, temperature control, or any combination thereof.

In some embodiments, the anode can be any convenient design that allows useful current densities. For example, the anode can be a titanium substrate coated with platinum. Such anode designs are now commercially available and used in electrolyzers.

Figure 5:
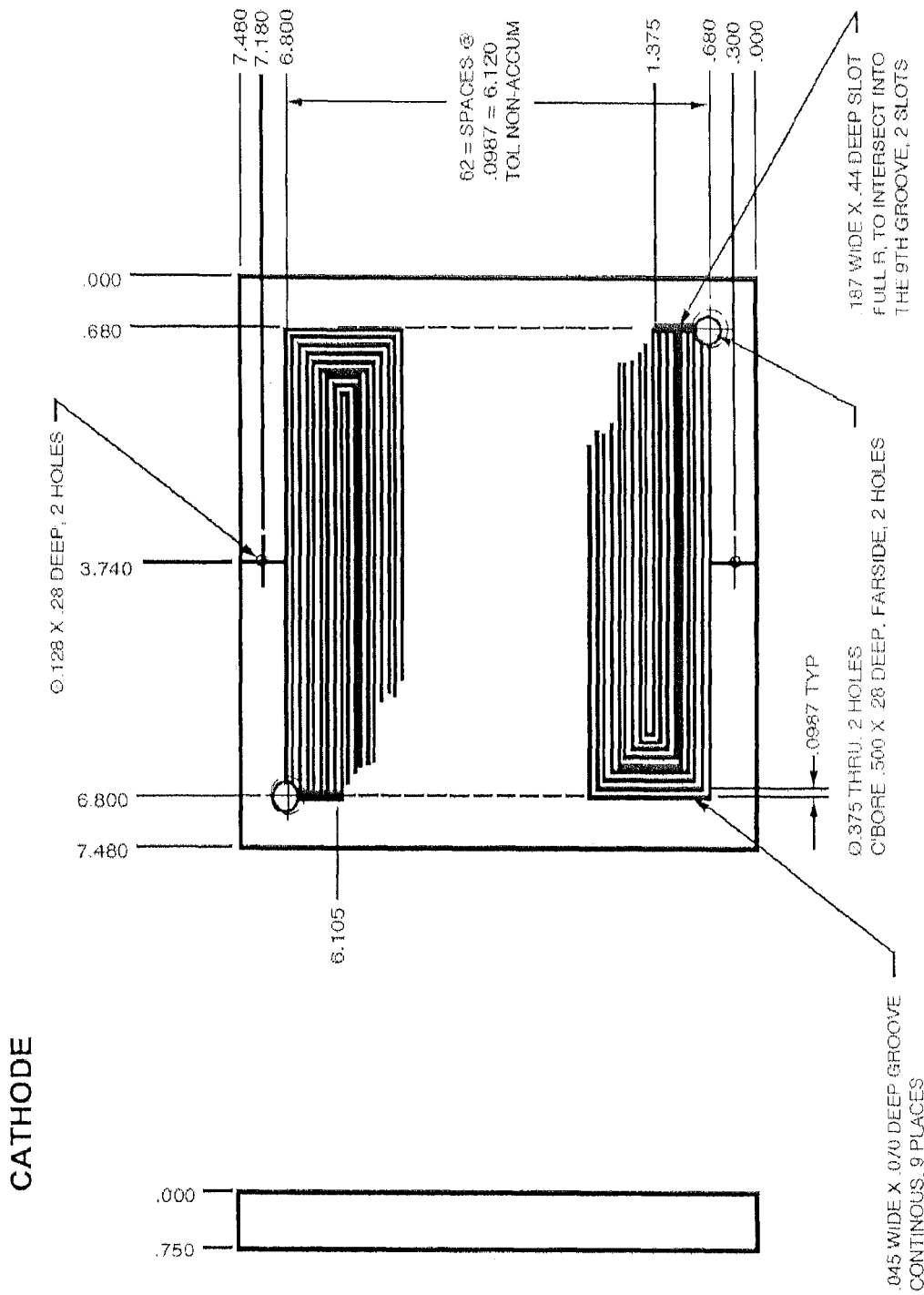
FIG. 5 illustrates an exemplary anode chamber design.

The anode chamber can be any convenient design that allows the input, recirculation, and temperature control of deionized water while simultaneously allowing the output, and optionally the collection, of gas generated at the anode surface, i.e. oxygen. FIG. 5 illustrates an exemplary anode chamber design.

In an embodiment or a method of use, the anode chamber can be filled with deionized water, and a sufficient voltage is applied to cause the electrolytic cleavage of water. This results in the formation of oxygen gas in the anode chamber, which can be released to the atmosphere or captured for other use. The hydronium ions ($H_3O^+$) concomitantly produced migrate along the electric gradient and pass through the membrane separating the anode and cathode chamber. This causes a physical flux of water from the anode chamber into the cathode chamber.

The cathode can be any convenient design that allows good current density and electron transfer to the electron transport mediator or directly to the biological system if no electron transport mediator is present. In one embodiment of the invention, the cathode of the electrolyzer possesses parallel channels designed to increase surface area and to maximize fluid flow (with any suspended solid particles) while maximizing the overall electron transfer characteristics of the cathode.

Figure 4:
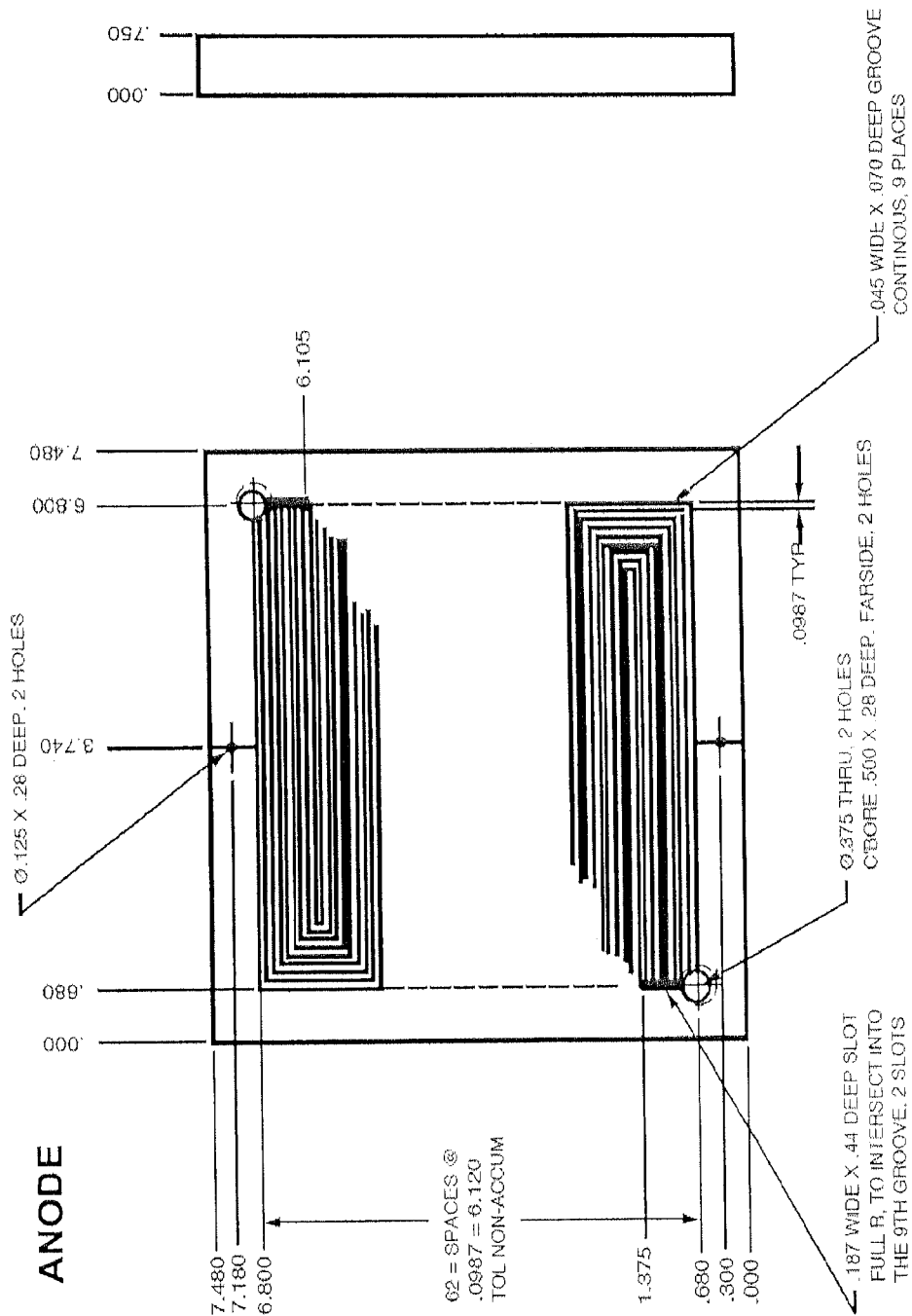
FIG. 4 illustrates an exemplary cathode chamber design.

The cathode chamber of the EBM, its physical construction, design of the flow characteristics and fluid flow field are designed for handling biological broths, e.g. fermentation broths, suspensions of whole cells and other heterogeneous biological mixtures. The cathode chamber can be any convenient design that allows fermentation broth or other heterogeneous mixtures to flow through the chamber. FIG. 4 illustrates an exemplary cathode chamber design. In one embodiment, the cathode chamber consists of nine serpentine channels which are sized based on broth flow rate, viscosity and size of particulates in broth. The serpentine channels in the cathode chamber are also designed to enhance overall electron transfer from the cathode itself, without decreasing broth flow rate.

In a further embodiment, the cathode chamber comprises a cathode primarily composed of carbon. This can be a solid piece of carbon that has been machined to have flow-channels or other physical shaping that increases surface area and contact time between the heterogeneous biological species and the cathode.

In another embodiment of the invention, the cathode chamber comprises a carbon electrode that is a thin sheet of carbon, carbon felt, or porous carbon. This is commercially known as "carbon paper" and is available under the following brand names, Toray Carbon Paper TGP-H-060, Carbon Paper AvCarb. Other similar products are also available and will be known to those skilled in the art.

Figure 6:
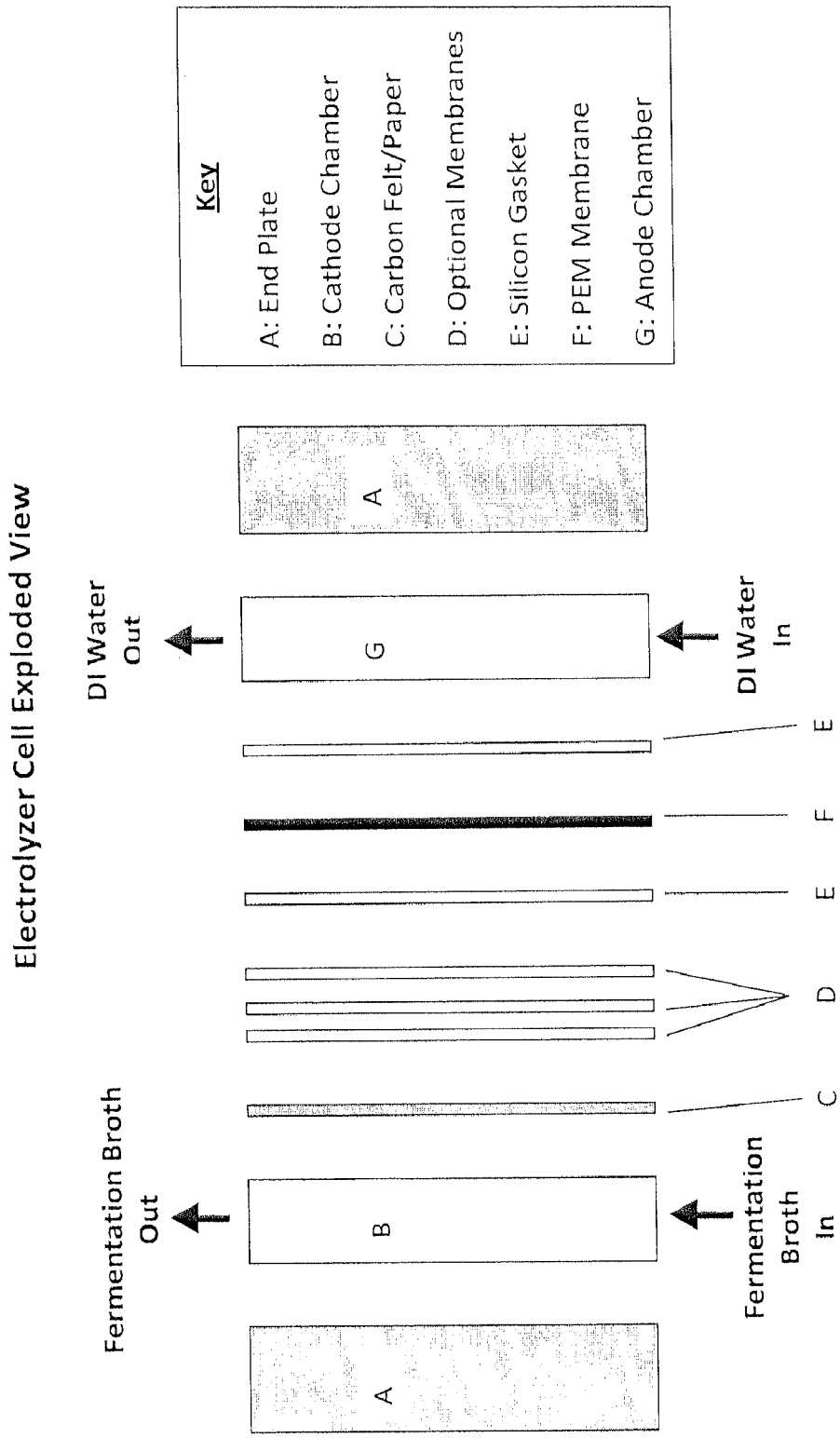
FIG. 6 illustrates an exemplary electrolyzer portion of the EBM system.

FIG. 6 illustrates an exemplary electrolyzer portion of the EBM system. Flow of the fermentation broth through the cathode chamber (B) and water through the anode chamber (H) is shown. The electrolyzer can have an endplate (A, I) at either end. A modified PEM (protein exchange membrane, F) can be placed between the cathode chamber and the anode chamber. Silicon gaskets (E, G) can be used to flank the PEM. One or more optional membranes (D) can be placed in the electrolyzer.

In various embodiments, an optional electron transport mediator can be added to the EBM system. The electron transport mediator can be mixed with the fermentation broth (which can contain a biological system such as cells and/or enzyme(s)) and fed into the cathode chamber. The electron transport mediator can also be retained in or by a membrane (e.g., beneath the membrane or within an external compartment attached to the membrane) positioned within the cathode chamber that separates the cathode from the biological system.

In an embodiment, the proposed system can use humic substances as an electron transport mediator. Humic substances have been shown to shuttle electrons between humic-reducing microorganism and Fe(III) oxide, as well as from microorganisms to the humic acid (see Lovley et al. "Humic substances as electron acceptors for microbial respiration" *Nature* 382, August 1996).

Humic acid has also been shown to oxidize [1,2-$^{14}$C] vinyl chloride and [1,2-$^{14}$C]dichloroethene to $^{14}CO_2$ (see Bradley et al., *Applied And Environmental Microbiology* Vol. 64, No 8:3102-3105, 1998). Various humic acid standard electrode potentials have been calculated (see Z. Struyk and Garrison Sposito, *Geoderma* 102: 329-246, 2001).

In some embodiments, neutral red can also be used as an electron-transport mediator. Neutral Red works principally via the direct chemical reduction of the redox cofactors such as nicotine adenine dinucleotide, NAD+ (Park and Zeikus, *J. Bacteriol.* 181: 403-2410, 1999).

The use of other electron transport mediators, such as methyl viologen (e.g. Sonomoto et al., *Journal of Bioscience and Bioengineering*, 104:3, 238-240 (2007) and others known in the art is compatible with the present invention.

In a first method of use, the EBM provides a method to reduce or eliminate the sacrificial loss of carbon used to generate reducing equivalents that occurs during metabolism by whole cells, either as an active fermentation or as resting cells held in a physiologically acceptable medium that allows the cells to continue metabolism but restricts or prevents cell growth. The reduction or elimination of the unwanted metabolic pathways will increase desired carbon flux, and reduce unwanted $CO_2$ production. Thus, using the EBM system for production of exemplary compounds such as ethanol, n-butanol, isobutanol, 3 MB or succinic acid will significantly increase carbon efficiency. In the case of the example involving the linked metabolic pathways of isobutanol production and 3 MB production, the independent control of the carbon stoichiometry and the hydrogen stoichiometry should permit regulation of the isobutanol to 3 MB ratio.

In a second method of use, the EBM system can be used to provide reducing equivalents to an isolated redox enzyme in the absence of whole cells. The enzyme can comprise a P450 enzyme and a P450 reductase. The enzyme can also comprise a modified P450 enzyme that has been engineered to include a P450 reductase activity.

In either method of use, the EBM system can be easily interfaced with existing capital equipment such as a large fermentor. Therefore, the EBM system can be readily utilized in advancing process engineering technology leading to increased efficiency of bio-based chemicals and biofuel production.

In one operational embodiment, the biological process stream is simply circulated through the cathode chamber and allowed to contact the cathode directly. In such an embodiment, electron transfer occurs directly from the cathode to the biological species, but rates of electron transfer may be slow.

In a further operational embodiment, an electron transport mediator can be added to the recirculating biological system in order to increase proton and electron transfer to the desired biological species. The mediator can be circulated through the device on the cathode side where it comes in contact with the cathode. Protons and electrons are transferred to the mediator, which then transfers these protons and electrons to the biological species. The mediator is recycled in this process and comes in contact with the cathode again to repeat the process. The concentration of electron mediator will be adjusted according to desired electron and proton transport characteristics.

In an optional embodiment, the electron transport mediator is contained behind or beneath an additional membrane, or is tethered or bound to the cathode to give a very high local concentration without having to be present in large volumes of the biological process stream(s).

In a further optional embodiment, a membrane can be interposed between the cathode and the biological system such that the optional membrane allows the passage of the electron transport mediator from the biological system to the cathode and back again, while preventing the physically larger components of the biological system, e.g. cells, cell debris, entrained solid particles, or even enzymes from contacting the cathode or entering the cathode chamber.

Use of the EBM is not restricted to whole cells. Other physical and operational embodiments include the use of isolated enzymes and P450.

As generally known in the art, the cytochrome P450 superfamily (abbreviated as CYP) is a group of enzymes that catalyze the oxidation of organic substances. The most common reaction catalyzed by cytochromes P450 is a monooxygenase reaction, e.g., insertion of one atom of oxygen into an organic substrate (RH) while the other oxygen atom is reduced to water:

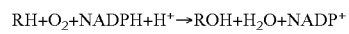

$$RH + O_2 + NADPH + H^+ \rightarrow ROH + H_2O + NADP^+$$

Based on the nature of the electron transfer proteins CYPs can be classified into several groups:

(1) Microsomal P450 systems in which electrons are transferred from NADPH via cytochrome P450 reductase (variously CPR, POR, or CYPOR). Cytochrome b5 (cyb5) can also contribute reducing power to this system after being reduced by cytochrome b5 reductase (CYB5R).

(2) Mitochondrial P450 systems that employ adrenodoxin reductase and adrenodoxin to transfer electrons from NADPH to P450.

(3) Bacterial P450 systems that employ a ferredoxin reductase and a ferredoxin to transfer electrons to P450.

(4) CYB5R/cyb5/P450 systems in which both electrons required by the CYP come from cytochrome b5.

(5) FMN/Fd/P450 systems originally found in *Rhodococcus* sp. in which a FMN-domain-containing reductase is fused to the CYP.

(6) P450 only systems, which do not require external reducing power. Notable ones include CYP5 (thromboxane synthase), CYP8 (prostacyclin synthase), and CYP74A (allene oxide synthase).

In the case of the embodiment for providing reducing equivalents to redox cofactors such as NADH/NADPH it is possible that non-productive reduced states of these cofactors can be formed. To prevent loss of the redox cofactor, it is necessary to pass the cofactor stream through an oxidation step after the desired redox reaction requiring the NADH/NADPH has been performed. In this oxidation step, the entire cofactor mixture will be exhaustively oxidized to remove non-productive reduced forms of the cofactor. Such oxidation can be performed by any convenient means, but preferably by a second EBM device operating in an oxidative manner.

In yet another embodiment, two or multiple electrolyzer assemblies within the EBM can be used in series or in a stacked pattern alternating anode and cathode plates with flow chambers on each side. This can provide decreased hardware costs and well as more efficient electrical conditions.

It will be understood by one of ordinary skill in the art that in any embodiment, the introduction of reducing equivalents by the EBM to the biological system can include one or more of the following actions:
a) The anode chamber is filled with deionized water, and the cathode chamber is filled with the bulk biological system to which electrons are to be transferred,
b) an external electric current of sufficient voltage (potential) is applied between the anode and the cathode such that water is electrolytically cleaved at the anode causing the flow of electrons into the anode and the formation of neutral oxygen ($O_2$) and positively charged hydronium ions ($H_3O^+$) in the anode chamber,
c) positively charged hydronium ions migrate from the anode chamber towards the cathode chamber through the PEM membrane, causing a net flux of water from the anode chamber into the cathode chamber, thus providing a source of protons in the cathode chamber,
d) electrons from the anode are driven by an external power source through the external electrical circuit to the cathode,
e) electrons are transferred from the cathode to the desired microbe, redox enzyme, redox cofactor or electron mediator on the cathode side of the PEM membrane,
f) the biological system performs the desired chemical reductions using the electrons provided from the cathode, either by direct transfer of electrons from the cathode, or via the transfer of electrons from the cathode to an electron transport mediator and then to the biological system, and/or
g) protons from the hydronium ions migrating from the anode chamber are disposed into the bulk biological system to balance the electrons that have been transferred to the biological system from the cathode.

It should be noted that the electricity input of this EBM system could come from a renewable resource (wind, solar, hydroelectric, etc.). Therefore, this technology provides another example of the added advantage of being able to store renewable energy for later use as a liquid fuel.

Various aspects of the present invention can be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment can be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

EXAMPLES

Reactions and fermentations can be performed according to the following illustrative, but not restrictive, examples.

Example A

Succinic Acid Proof of Concept

Two 7-liter fermentation vessels containing actively growing E. coli strain AFP184, obtained from the United States Department of Agriculture (U.S. Pat. No. 6,743,610; and Nghiem et al., Appl Biochem Biotechnol (2010) 162: 1915-1928), are prepared in the following manner. 5 Liters of growth medium are prepared containing the following (per liter of double-distilled water): 100 g glucose, 1.46 g $K_2HPO_4$, 0.62 g $KH_2PO_4$, 3.4 g $(NH_4)_2SO_4$, 0.42 g $MgSO_4.7H_2O$, 15 g corn-steep liquor, 1 ml of antifoam A-204 (Sigma Aldrich) and 500 microM neutral red (Sigma Aldrich). One fermentor is used as a control, while the second fermentor was used for demonstrating the advantage of continuously recirculating the fermentor contents through the Electrochemical Bioreactor Module (EBM) (BioChem-Insights, Inc., Malvern, PA).

The salts, corn-steep liquor and neutral red are combined and sterilized in the two 7-liter fermentors separately from the glucose. After sterilization, the glucose is combined with the other components and the pH of the completed medium is adjusted to 6.5 in both fermentors. In addition, 1 liter of 1.5M $Na_2CO_3$ is filter sterilized and provided for pH control. Another two flasks each containing 50 ml of medium are prepared for inoculation purposes; this medium contains the same salts and corn-steep liquor amounts as the growth medium, but does not contain neutral red and contains a concentration of glucose of only 5 g/L. Each flask of inoculum medium is itself inoculated with 0.2 ml of thawed stock culture and allowed to grow on a shaker at 250 rpm and 37° C. for 16 hours at which time it is used to inoculate the 5 liters of growth broth in the two 7-liter fermentors. Each fermentor is allowed to grow aerobically (1 vvm) for 9 hours with active pH control at pH 6.5.

After 9 hours, aeration is shut off and the fermentors are allowed to continue growing anaerobically. At this time, the second fermentor is connected to the highly-instrumented EBM via an external recirculation loop in order to demonstrate the impact of providing exogenous reducing equivalents to the biological system, i.e. the fermentation broth. The entire contents of the second fermentor are continuously recycled between the 7-liter fermentation vessel and the Electrochemical Bioreactor Module (EBM). A computer-controlled peristaltic pump is used to adjust the flow rate from the fermentor through the EBM unit at the desired flow rate. A voltage of −2.5 V is applied to the EBM and the current is measured at 1 second intervals. The current provided to the EBM over 24 hours ranges from 1.5 amps to 3.1 amps with an average value of approximately 1.9 to 2.0 amps. At these conditions, the EBM unit has a Faradaic Efficiency of 78%.

Broth samples are taken from the control fermentor and from the fermentor connected to the EBM unit to determine the levels of glucose and succinic acid, as well as levels of anticipated by-products lactic and acetic acids by high-performance liquid chromatography. The results are shown in FIG. 7 and in Table 1 below.

TABLE 1

|  | 6.5 hours (moles) | 24 hours (moles) | Net Production or Consumption (moles) |
| --- | --- | --- | --- |
| Control Fermentor |  |  |  |
| Glucose consumed | 0.27 | 0.85 | 0.58 |
| Succinate produced | 0.27 | 0.98 | 0.71 |
| Lactate produced | 0.02 | 0.04 | 0.02 |
| Acetate produced | 0.05 | 0.12 | 0.07 |
| EBM Fermentor |  |  |  |
| Glucose consumed | 0.50 | 1.10 | 0.60 |
| Succinate produced | 0.39 | 1.16 | 0.77 |
| Lactate produced | 0.01 | 0.06 | 0.05 |
| Acetate produced | 0.08 | 0.12 | 0.04 |

Figure 7:
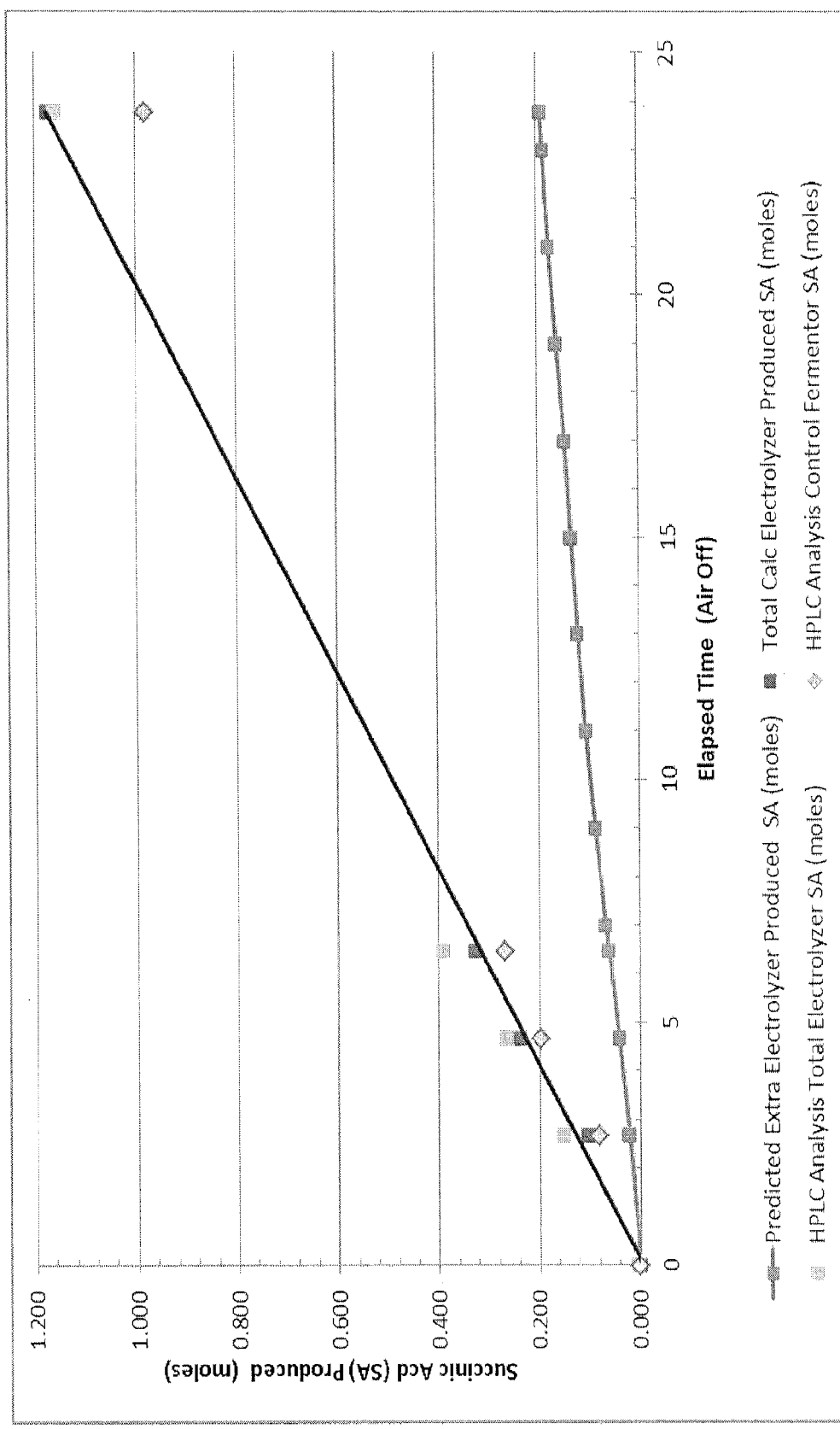
FIG. 7 shows graphically the difference in production of succinic acid by the control fermentor and the fermentor connected to the EBM unit.

The results displayed graphically in FIG. 7 show that the fermentor connected to the EBM unit produced more succinic acid over 24 hours than the control fermentor. Table 1 lists the molar amounts of glucose consumed and the molar amounts of succinic, lactic, and acetic acids produced by the control fermentor and the fermentor connected to the EBM unit via the recirculation loop. These values are over the time between 6.5 hours and 24 hours after the two fermentors had reached the same rate of glucose consumption. The values are also corrected for volume changes caused by the addition of the $Na_2CO_3$ solution for pH control over time.

Between the elapsed time of 6.5 and 24 hours, the control fermentor consumed 0.58 moles of glucose and produced 0.71 moles of succinic acid, plus 0.02 moles of lactic acid and 0.07 moles of acetic acid. It is important to consider these last two acids as they contribute to the overall requirement for reducing equivalents by the fermentation. The production of lactic acid requires one mole of reducing equivalents for each mole of lactic acid, while the production of acetic acid allows the cell to endogenously generate 2 moles of reducing equivalents for each mole of acetic acid produced.

The fermentor connected to the EBM consumed 0.60 moles of glucose while producing 0.77 moles of succinic acid, plus 0.05 moles of lactic acid, but only produced 0.04 moles of acetic acid over the same time period (6.5 hours to 24 hours).

Over the same time period, the current measured in the electrolyzer, which runs at a Faradaic Efficiency of 78% for operating conditions described above, results in delivering 0.260 moles of electrons (plus the corresponding number of hydronium ions, i.e. reducing equivalents) to the connected fermentation vessel, i.e. 0.260 moles of reducing equivalents.

The control fermentor produced succinic acid according to the following stoichiometry:

$$7C_6H_{12}O_6 + 6CO_2 \rightarrow 12C_4H_6O_4 + 6H_2O$$

The increased amount of succinic acid produced by the fermentor connected to the EBM unit over the amount of succinic acid produced by the control fermentor was (0.58/0.60)×(0.77−0.71)=0.058 moles. This is an increase of 6% more succinic acid from the same amount of glucose. To produce more succinic acid from the same amount of glucose the fermentor connected to the EBM unit must be following the stoichiometry in the equation below. (Note that the theoretical maximum increases by 16% with this equation.)

$$7C_6H_{12}O_6 + 14CO_2 + 28H^* \rightarrow 14C_4H_6O_4 + 14H_2O$$

This stoichiometry shows that two moles of reducing equivalents are required for each mole of succinic acid produced. Thus, out of the 0.260 moles of exogenous reducing equivalents provided to the fermentor by the EBM unit, 0.116 moles (2×0.058) were used to produce the additional succinic acid. The fermentor connected to the EBM unit also produced an excess of 0.030 moles of lactic acid over the control fermentor, thus utilizing an additional 0.030 moles of reducing equivalents. This EBM fermentor also generated 0.030 moles less acetic acid than the control fermentor, accounting for a further 0.060 moles of reducing equivalents.

Thus, out of the 0.260 moles of reducing equivalents delivered by the EBM unit, (0.116+0.030+0.060)=0.206 are directly accounted for by the increased amounts of succinic and lactic acid production, and the reduced amount of acetic acid production by the EBM fermentor. Not all metabolic characteristics of the fermentations could be measured, such as total cell mass or other metabolic products. However, the remaining 0.054 moles of reducing equivalents delivered to the EBM fermentor could be attributed to these additional metabolic needs for reducing equivalents.

Example B

Effect of Flow Rate on Electrolyzer Current

The ability of a given unit volume of fermentation broth to accept reducing equivalents from the cathode chamber of the EBM unit is limited by unit volume's ability to transfer those reducing equivalents to a metabolic process in the fermentation vessel. Thus, once the metabolic pools of reducing equivalents are filled, no more exogenously provided reducing equivalents (i.e. electrons and hydronium ions) can be transferred to the microbes in the fermentation vessel which results in a decrease in the current in the cathode chamber of the EBM unit. Conversely, if fermentation broth entering the cathode chamber is relatively depleted in reducing equivalents, then the current in the cathode chamber will increase as the EBM delivers reducing equivalents to the metabolic processes demanding more reducing equivalents. In this operating condition, increasing the flow rate causes more and more broth relatively depleted in reducing equivalents to enter the cathode chamber per unit time so that the cathode current will increase linearly with the flow rate. As the flow rate of broth through the cathode chamber continues to increase, the residence time continues to decrease. When the residence time is sufficiently short, not all reducing equivalents that are needed by the fermentation broth can be transferred in the cathode chamber. Above this transitional flow rate the relationship between flow rate and current will be non-linear.

Figure 8:
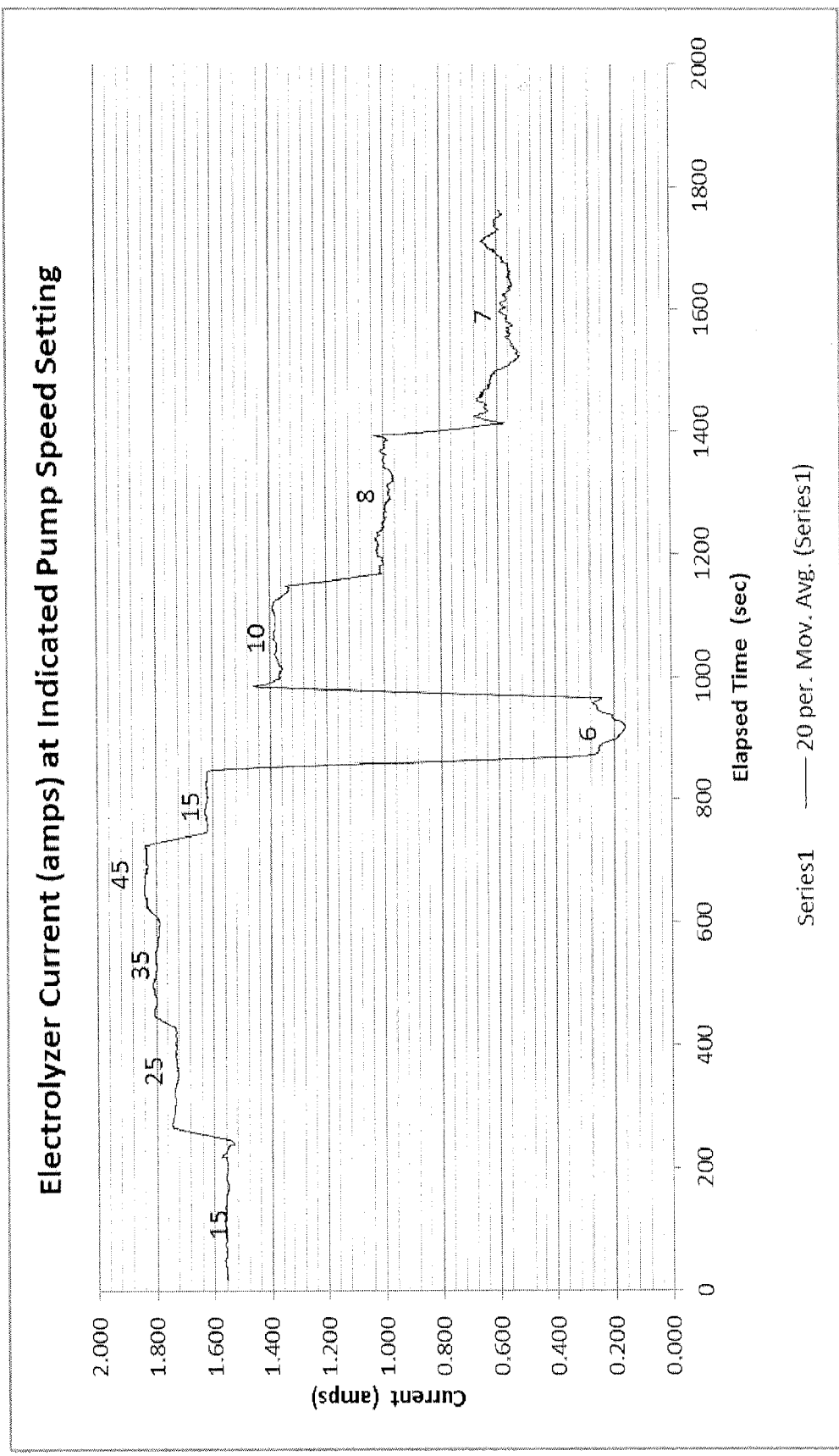
FIG. 8 shows graphically the dependence of current on flow rate of fermentation medium through the cathode chamber of the EBM unit.

In order to demonstrate the dependency of current on flow rate of fermentation broth through the EBM unit, a mixed-culture fermentation is prepared in the same manner as Example A. The mixed culture can contain *E. coli, Lactobacillus* sp. or other convenient micro-organisms that are good producers of metabolic products requiring the consumption of reducing equivalents, such as lactic acid or succinic acid. Various flow rates through the EBM unit from 0 to 3 LPM are run to determine the impact of flow rate on current. The current values measured at various pump speeds are shown graphically in FIG. 8.

Figure 9:
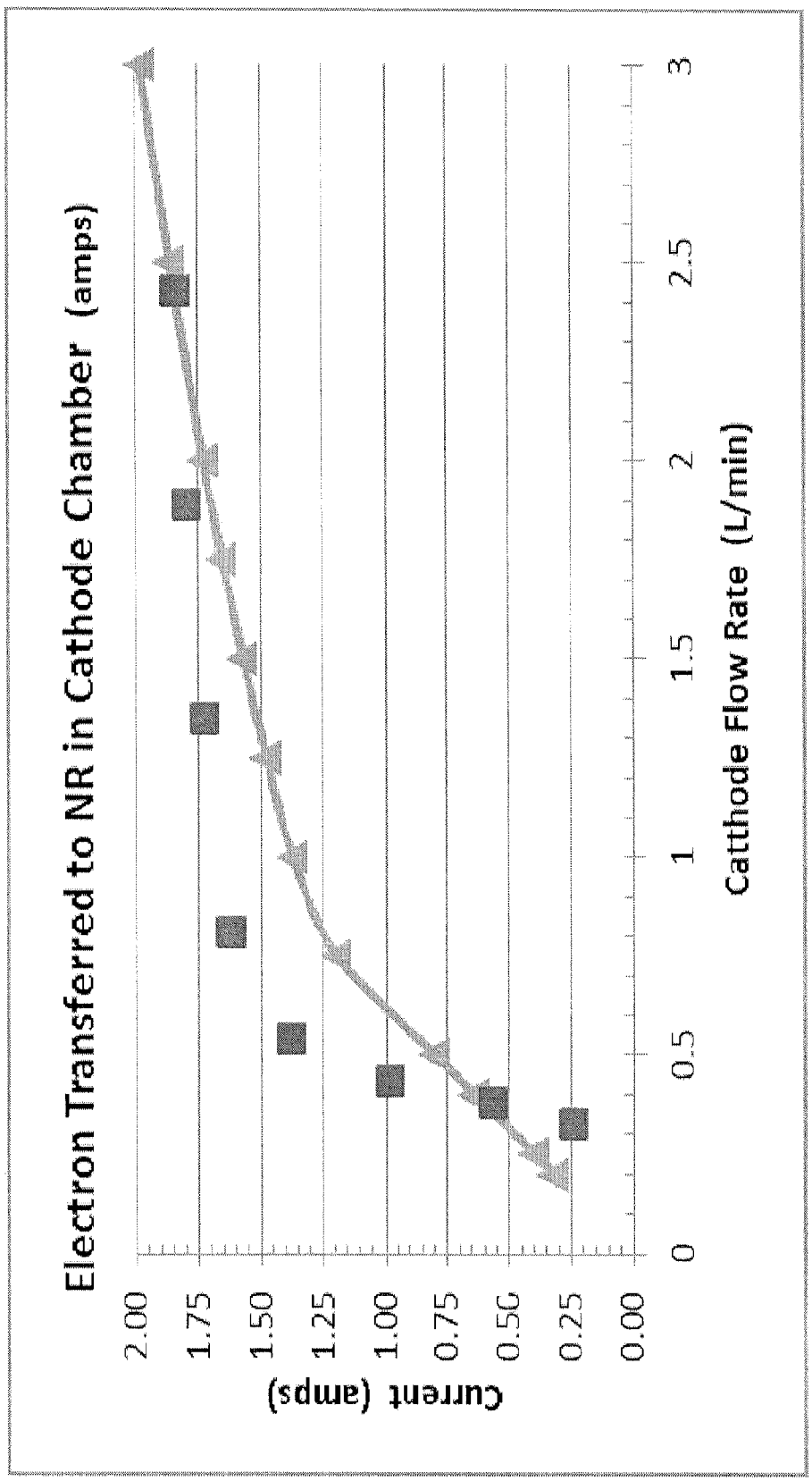
FIG. 9 shows the linear dependency of current on flow rate and the point at which this breaks down as the flow rate becomes too high.

FIG. 9 shows that current passing through the EBM unit becomes non-linearly dependent on the flow rate of the fermentation medium through the cathode chamber after the flow rate reaches a critical value. This is the flow rate at which the fermentation broth relatively depleted in reducing equivalents has such a short residence time in the cathode chamber that the EBM unit cannot fully regenerate the entire redox pool before the broth exits the cathode chamber. At flow rates above this critical value, the current will asymptotically approach a constant value and effectively will no longer be dependent on flow rate.

Example C

In order to further test the control and regulation aspects of the EBM system a series of samples are generated in the same manner as Example A with the exception of applied voltage across the anode and cathode of the EBM. Various voltages between 0.0 V and −4.0 V are used. The voltages are varied to determine the optimum potential for succinic acid production, up to the maximum possible voltage before the Faradaic Efficiency reaches 100% as measured by hydrogen gas production. The succinic acid production is measured along with all other parameters in Example A.

Example D

In order to test the performance of electron transport mediators in the EBM system a series of samples are generated in the same manner as Example A with the following exceptions; the mediator type and concentration are varied in the fermentation broth. Mediators of humic acid, Neutral Red, methyl viologen, and anthraquinone-2,6-disulfonate, are used in various concentrations ranging from 0 M to the given mediator's limit of solubility in the fermentation broth. The succinic acid production is measured along with all other parameters in Example A.

Example E

In order to show the utility of the EBM system for providing reducing equivalents to redox reactions catalyzed by a single, isolated redox enzyme, the reduction of acetophenone to phenethyl alcohol by alcohol dehydrogenase (EC 1.1.1.1) in performed in the presence of NAD+ cofactor. Alcohol dehydrogenase, NAD+ and acetophenone are mixed in a phosphate buffer at pH 7, and the solution is run through the anode chamber of the EBM via a recirculation loop. A sufficient voltage is applied to cause the reduction of NAD+ to NADH. NADH is binds to the alcohol dehydrogenase and reduces the acetophenone to phenethyl alcohol, with the concomitant oxidation of NADH back to NAD+. The NAD+ species is recirculated back through the cathode chamber and is reduced again to NADH. The progress of the reduction of acetophenone to phenethyl alcohol is monitored by HPLC.

The electrochemical reduction of NAD+ to NADH in known to give the non-biologically active 2-dihydro and 5-dihydro species of the nicotinamide ring as well as the biologically active 4-dihydrospecies, and the NAD+ produced by the enzymatic reaction would be reduced to these three species. Over time, essentially all of the NAD+ would be reduced and accumulate as the non-biologically active 2-dihydro and 5-dihydro species. Thus it is necessary to oxidize the 2-dihydro and 5-dihydro species back to NAD+ prior to re-entry of recirculating reaction mixture back in to the cathode chamber.

Example F

The production of n-butanol by *Clostridia* sp. proceeds through an acidogenic phase followed by a solvent generating phase during which butyric acid produced in the acidogenic phase is reduced to n-butanol. Electron transport to provide reducing equivalents is of great importance in the solvent generating phase and the production of n-butanol can be enhanced by providing electron transport mediators such as methyl viologen (Sonomoto et al., *Journal of Bioscience And Bioengineering*, 104:3, 238-240 (2007)). However, the reduction of butyrate to n-butanol still requires the consumption of glucose to provide reducing equivalents.

A culture of *Clostridium saccharoperbutylacetonicum* N1-4 (ATCC13564) is grown and is allowed to proceed through the acidogenic phase. Upon depletion of glucose, methyl viologen is added to the fermentation broth and the fermentation broth is recirculated through the EBM. The production of n-butanol and decrease of butyrate is monitored to show the production of n-butanol in the absence of glucose.

EQUIVALENTS

The present invention provides among other things novel methods and devices for providing reducing equivalents to biological systems. While specific embodiments of the subject invention have been discussed, the above specification is illustrative and not restrictive. Many variations of the invention will become apparent to those skilled in the art upon review of this specification. The full scope of the invention should be determined by reference to the claims, along with their full scope of equivalents, and the specification, along with such variations.

INCORPORATION BY REFERENCE

All publications, patents and patent applications cited above are incorporated by reference herein in their entirety for all purposes to the same extent as if each individual publication or patent application were specifically indicated to be so incorporated by reference.

The invention claimed is:

1. A device comprising:
    a) an anode contained in an anode chamber and a cathode contained in a cathode chamber, the two chambers being separated by at least one membrane which allows water molecules, either neutral or positively charged, to pass through the at least one membrane from one chamber to the other chamber, wherein the anode chamber consists of deionized water therein in contact with the anode and optionally oxygen and proton;
    b) an aqueous medium containing a biological system in the cathode chamber in contact with the cathode, said biological system being capable of performing a reductive biological process;

c) a loop for continuously recirculating the aqueous medium from an external vessel through the cathode chamber and back in to the external vessel;
d) an external power source providing a voltage between the anode and the cathode;
e) a detection instrumentation having a continuous fluorometric detector for monitoring intracellular NADH or NADPH so as to control a degree of reduction in the reductive biological process; wherein the device further comprises a computer-controlled peristaltic pump for adjusting a flow rate of the aqueous medium at a level above a transitional flow rate where a relationship between the flow rate and current is non-linear; and
f) one or more separation membranes situated between the cathode and the biological system such that the cathode is not in direct contact with the biological system.

2. The device of claim 1 wherein the external vessel is a fermentation tank.

3. The device of claim 1 further comprising an electron transport mediator retained by the one or more separation membranes and optionally present in a fluid medium, such that the electron transport mediator provides electron transport from the cathode to the biological system.

4. The device of claim 1 wherein the aqueous medium further comprises an electron transport mediator.

5. The device of claim 4 wherein the electron transport mediator is humic acid or neutral red.

* * * * *